JOHN FOREMAN.
Improvement in Thrashing-Machines.
No. 114,794. Patented May 16, 1871.
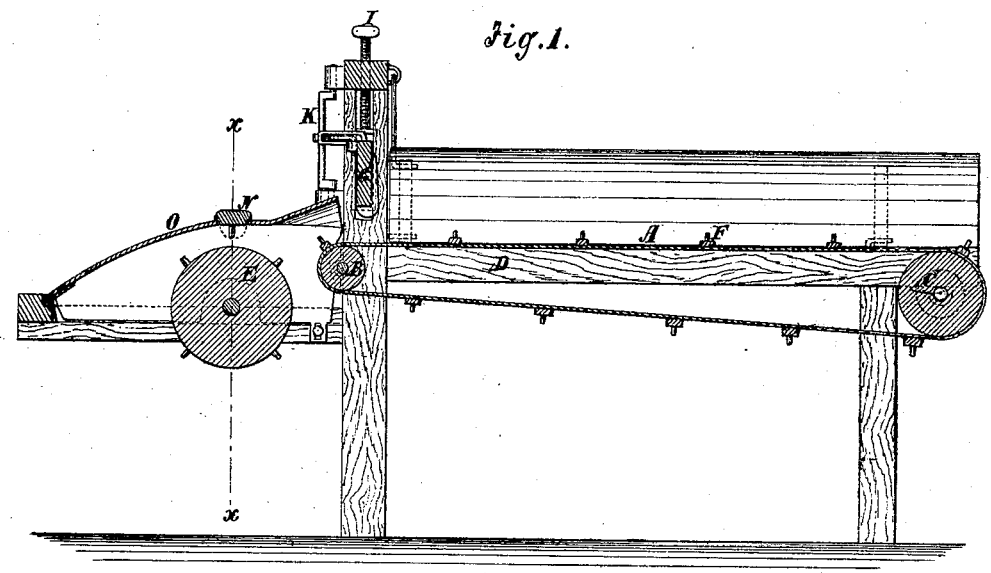
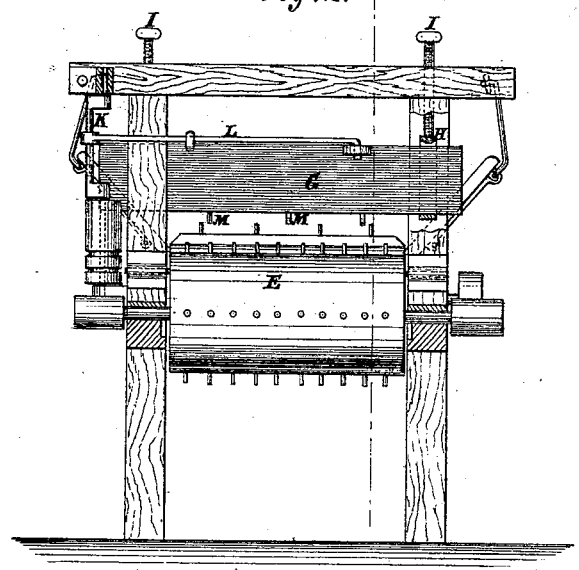
Witnesses:
A. Benneckendorf
Wm. H. C. Smith
Inventor:
J. Foreman
Per Wmm &Co.
Attorneys.

United States Patent Office.

JOHN FOREMAN, OF HEALDSBURG, CALIFORNIA.

Letters Patent No. 114,794, dated May 16, 1871.

IMPROVEMENT IN THRASHIHG-MACHINES.

The Schedule referred to in these Letters Patent and making part of the same.

*To all whom it may concern:*

Be it known that I, JOHN FOREMAN, of Healdsburg, in the county of Sonoma and State of California, have invented a new and useful Improvement in Thrashing-Machines; and I do hereby declare that the following is a full, clear, and exact description thereof, which will enable others skilled in the art to make and use the same, reference being had to the accompanying drawing forming part of this specification.

This invention relates to improvements in thrashing-machines; and

It consists, in a combination with the thrashing-cylinder, of a feeder and spreader for feeding the cylinder and regulating the supply of grain to it, said parts being constructed and arranged to operate as hereinafter described.

Figure 1 is a longitudinal sectional elevation of my improved feeding apparatus and a thrashing-cylinder, and Figure 2 is a transverse section taken on the line *x x*.

Similar letters of reference indicate corresponding parts.

A is an endless carrier running over rollers B C, mounted on a frame D, toward the thrashing-cylinder E, for conveying the grain to it, the said grain being pitched or otherwise placed on it as evenly as can well be as the belt moves along.

The said belt has short rake-teeth F, or other like devices, for insuring the moving of the grain.

G is a spreader, which consists of a plate arranged across the machine a short distance from the discharging end of the belt, and above it in vertically-adjustable supports H, suspended by screws I.

The said spreader is reciprocated back and forth by a crank, K, to which it is connected by a rod, L, said crank being turned slowly by any suitable means.

This plate, which is placed edgewise vertically, has teeth M in the lower edge for acting on the grain as it is brought along to it by the apron to spread and equalize it.

The spiked concave N is arranged above the cylinder on the cover O, which is hinged to the frame at P, and fastened down at the other end by hooks or other means.

The cylinder turns upward from the apron in the manner of a "doffer" of a carding-machine, carrying the straw therefrom to the concave.

The frame D supporting the carrier is detachably connected to the cylinder-frame so that they may be separated for convenience in conveying from place to place.

This apparatus will perform the labor of several men in regulating the feed, and will avoid the dangers of feeding by hand.

It will feed either long straw or headed grain, or bound or loose. In the case of bound grain the spreader G will loosen the band.

Having thus described my invention,

I claim as new and desire to secure by Letters Patent—

The thrashing-cylinder E, concave N, endless belt A, spreader G, long crank K, and rod L, all constructed and arranged to operate in the manner shown and described.

JOHN FOREMAN.

Witnesses:
    JOSEPH WILLIAMS,
    LEVI STOUGH.